Figure 5:
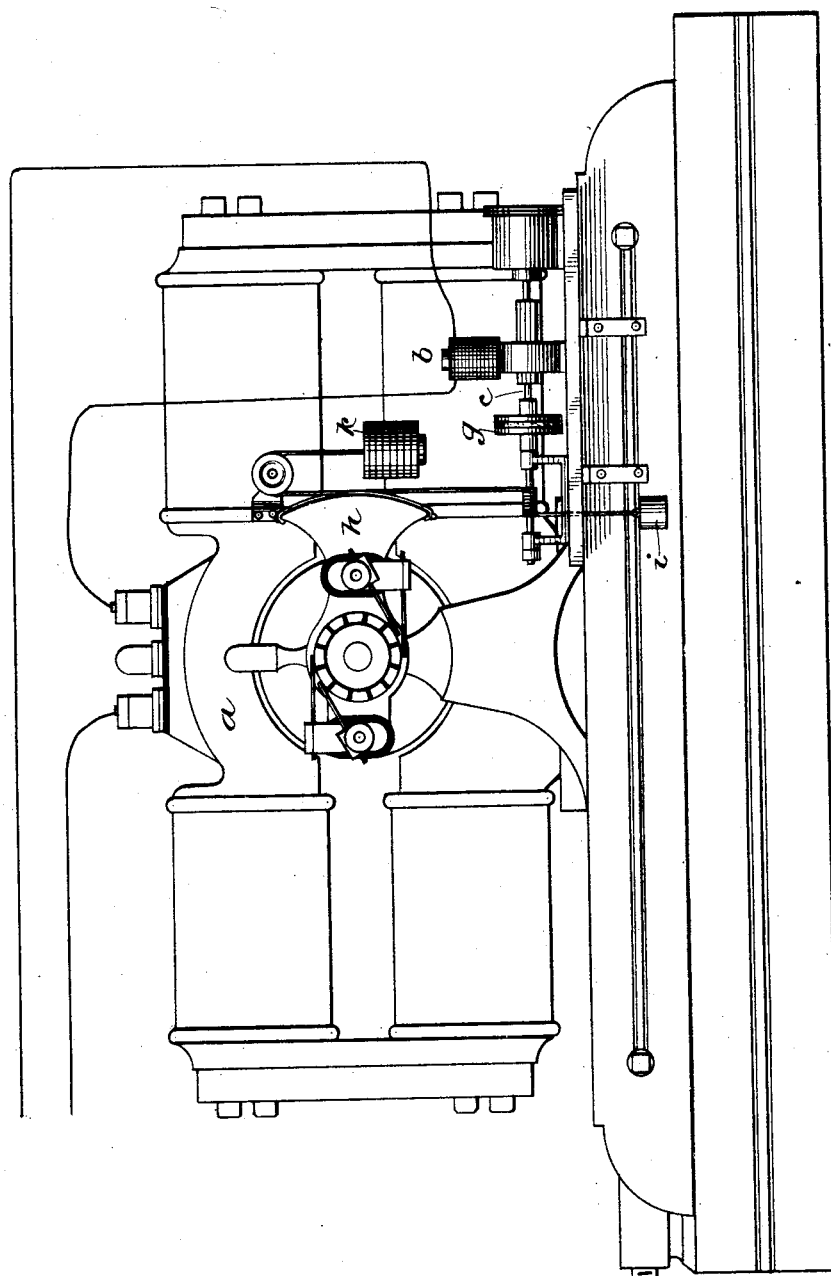

(No Model.) 2 Sheets—Sheet 1.
E. P. WARNER.
ELECTRIC CURRENT REGULATOR.
No. 427,530. Patented May 6, 1890.
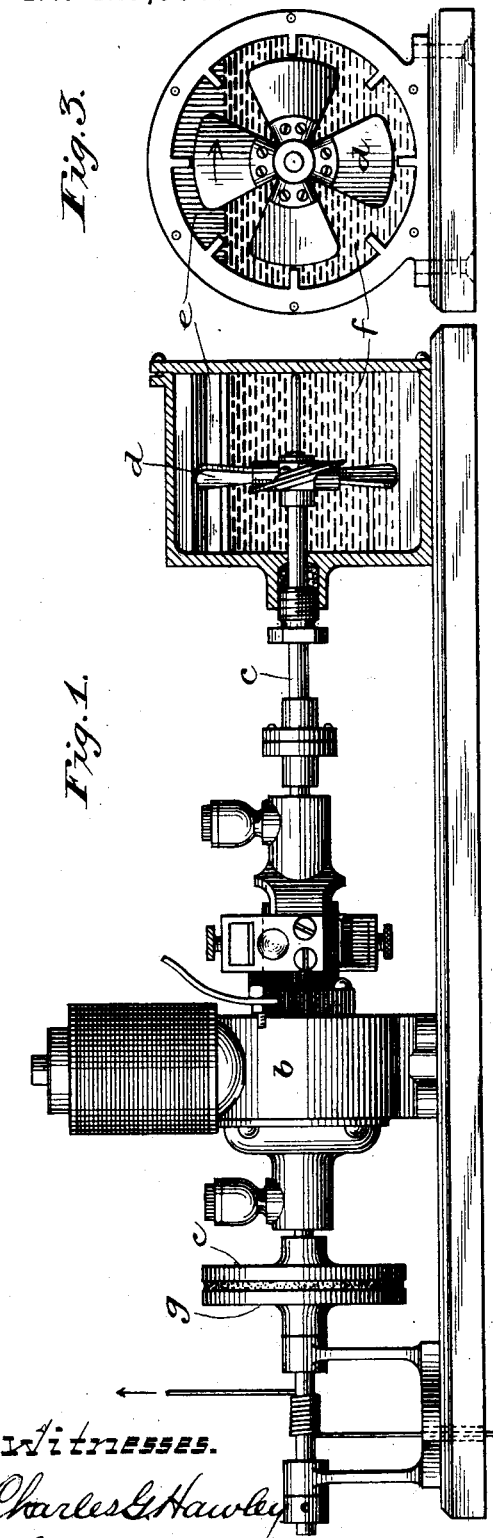
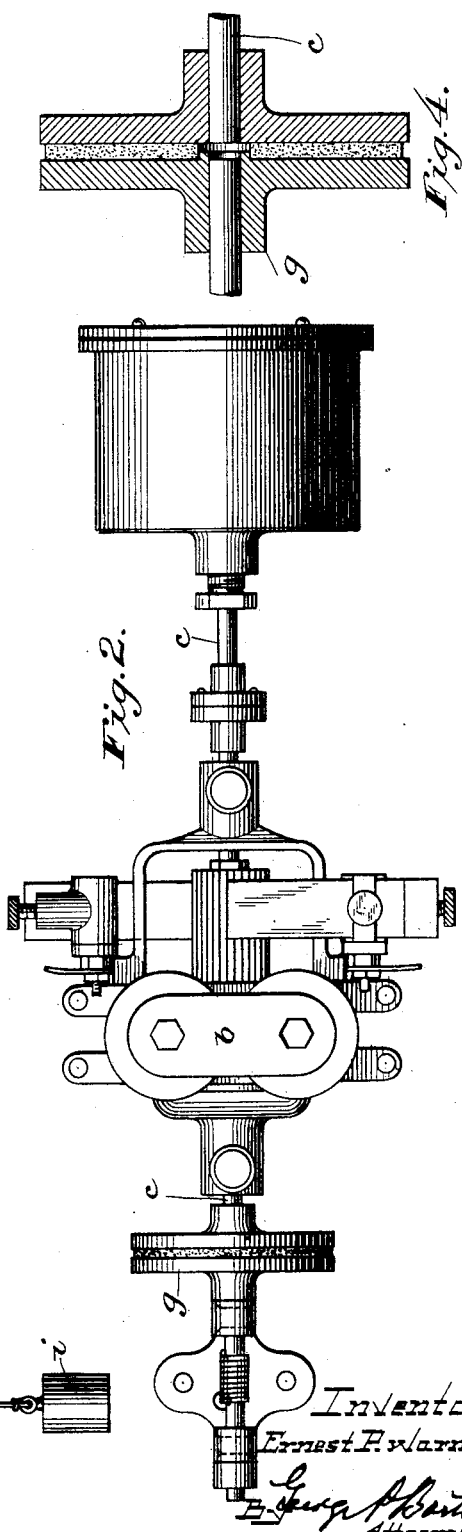
Witnesses.
Charles G. Hawley
Geo. R. Parker.
Inventor.
Ernest P. Warner.
George A. Barton
Attorney (No Model.) 2 Sheets—Sheet 2.

E. P. WARNER.
ELECTRIC CURRENT REGULATOR.

No. 427,530. Patented May 6, 1890.

Witnesses.
Charles G. Hawley.
Geo. R. Parker.

Inventor.
Ernest P. Warner
By George A. Barton
Attorney

UNITED STATES PATENT OFFICE.

ERNEST P. WARNER, OF CHICAGO, ILLINOIS.

ELECTRIC-CURRENT REGULATOR.

SPECIFICATION forming part of Letters Patent No. 427,530, dated May 6, 1890.

Application filed February 3, 1890. Serial No. 339,057. (No model.)

*To all whom it may concern:*

Be it known that I, ERNEST P. WARNER, a citizen of the United States, residing at Chicago, in the county of Cook and State of Illinois, have invented a certain new and useful Improvement in Current-Regulators, (Case 29,) of which the following is a full, clear, concise, and exact description, reference being had to the accompanying drawings, forming a part of this specification.

My invention relates to electric motors and dynamo-electric machines; and the specific object of my invention as described herein is to change the brushes upon the commutator of the dynamo-electric machine responsively to variations in the current strength, so as to maintain the current practically uniform under varying load—as, for example, in systems of arc lighting.

My invention, it will be seen, however, has a broader significance and application, and therefore, as set forth in certain of the claims, I do not limit myself to current-regulation, as certain features or parts of my invention might be used for other purposes.

My invention consists, first, in a shaft driven by an electric motor and provided with a screw like that of a propeller, which is inclosed in a chamber filled or partially filled with liquid, preferably glycerine, and so arranged as to impart to the shaft a greater or less longitudinal thrust, according to the speed with which the shaft is driven; second, in a driven shaft having a screw thereon working in a liquid and adapted to give the shaft a longitudinal thrust determined by the speed of the shaft, of a second shaft or rotating device tending to move against the force of the first shaft with which it is in frictional engagement, the amount of friction being determined by the thrust caused by the screw rotating at a greater or less speed in the liquid; third, in an electric motor having its shaft provided with a screw working in a closed chamber of liquid for giving the shaft a longitudinal thrust against friction device, said friction device forming a medium of connection between the shaft of the motor and a rotating device connected with the brushes of the dynamo-electric machine, whereby increase of current in the motor caused by a lessening of the load, which would cause the speed of the motor to be increased, acts to increase the thrust of the shaft upon the friction device, so as to rotate the rotating device connected with the brushes to move the brushes upon the dynamo, so as to reduce the electro-motive force to bring the current back to its normal; and, fourth, in a motor included in the circuit of a dynamo-electric machine, the shaft of said motor being provided with mechanism for giving said shaft a longitudinal thrust dependent upon the speed of the motor—that is, upon the strength of the current supplied to the motor—and a counterbalanced rotating device connected with the brushes of the dynamo to vary the position of said brushes responsively to changes in the current, so as to maintain the current strength.

My invention will be readily understood by reference to the accompanying drawings, in which—

Figure 1 is a side elevation of a motor having its shaft provided with the screw in a closed chamber containing liquid, and a counterbalanced rotating device connected with said shaft by frictional engagement, the frictional engagement being varied by variations in the speed of the shaft. Fig. 2 is a plan view of the same. Fig. 3 is an end elevation of the chamber containing the screw and the liquid, the cap or side of the chamber being removed. Fig. 4 is a detail sectional view of the friction device. Fig. 5 is a view showing my invention applied as a current-regulator to a dynamo-electric machine, the motor being included in the circuit of the dynamo, which may be considered as supplying an arc-lamp circuit.

The dynamo-electric machine $a$ may be considered as of a well-known type in which the brushes are adapted to be shifted upon the commutator to vary the electro-motive force of the machine. The motor $b$ may also be in general construction of any well-known type. I have used the style known as the "C & C" motor. The shaft $c$ of this motor is provided with bearings, which permit of a slight longitudinal movement or thrust. Upon this shaft is mounted the screw $d$, which screw is inclosed in a chamber $e$, containing liquid $f$. The liquid may be glycerine or some similar substance. The chamber is preferably slightly larger in circumference than the screw, and I have obtained the most satisfactory results when the liquid does not entirely fill the chamber. The wings on the interior of the chamber I have found also of advantage to prevent the liquid from rotating too freely with the screw.

It is evident that the rotation of the screw in the liquid will give the shaft $c$ a thrust toward the rotating friction device $g$. The engagement between the shaft $c$ and the device $g$ is frictional, two opposing disks being provided, preferably, with a leather washer between them, as shown most clearly in Fig. 4. The amount of frictional engagement will therefore be determined by the thrust of the shaft $c$, which thrust depends upon the current through the motor, which determines the speed of the revolution of the screw in the liquid. Now by connecting the rotating device $g$ with the brush-carrier $h$ of the dynamo the position of the brushes may be automatically controlled, the connection being such that increase in thrust, and consequently movement, of the rotating device $g$ in one direction will move the brushes forward to diminish the electro-motive force of the machine, while less thrust will permit the rotating device $g$ to move in the opposite direction to carry the brushes backward to increase the electro-motive force, while when the current, and consequently the frictional pressure, is normal the rotating device $g$ will remain at rest and the brushes will be in position to supply just the amount of electro-motive force required to maintain the current strength. Thus, as shown in Fig. 1, when the current is increased and consequently the frictional thrust, the weight $i$ will be wound up and at the same time the brush-carrier $h$, connected with the device $g$, will be moved to carry the brushes forward. If, however, the current falls below the normal, the weight $k$ will act upon the brush-carrier and rotating device $g$, and thus the brush-carrier $h$ will be carried in a direction to move the brushes back far enough, so as to increase the electro-motive force and bring the current up to its normal strength.

Having thus described my invention, I claim as new and desire to secure by Letters Patent—

1. The combination, with a driven shaft provided with a propeller-screw mounted thereon and inclosed in a vessel containing liquid, of a rotating device in frictional engagement with said shaft, said shaft having a longitudinal movement in its bearings, the longitudinal thrust thereof, and consequently the frictional engagement with the frictional rotating device, being determined by the rate of revolution of the propeller-screw in the liquid, substantially as and for the purpose specified.

2. An electric motor included in a circuit for supplying the same with current, the shaft of said motor having mounted thereon a propeller-screw contained in a tank of liquid, said shaft being adapted to move longitudinally in its bearings with a greater or less thrust determined by the speed of the propeller-screw in the liquid, in combination with a rotating frictional device $g$, with which said shaft of the motor is in engagement, said rotating device tending to move in one direction in opposition to the force of the shaft as it is pressed against the same, the opposing forces acting upon the frictional rotating device being at the normal speed of the motor balanced, whereby the movement of the rotating device in one direction or the other is determined by the variations in the longitudinal thrust as determined by the changes in speed of the motor, substantially as and for the purpose specified.

3. The combination, with a dynamo-electric machine, of an electric motor included in circuit therewith, means for giving the shaft of the motor a longitudinal thrust dependent upon the speed of the motor, and a frictional device impelled in one direction or the other accordingly as the speed of the motor is above or below its normal rate, said rotating frictional device being connected with the brushes of the commutator to change the position thereof responsively to variations in the current strength to maintain the current strength practically uniform under varying load, substantially as and for the purpose specified.

4. The combination, with the dynamo-electric machine and an electric motor included in circuit therewith, of the propeller-screw $d$, inclosed in a chamber of liquid $e$ for giving the shaft a longitudinal thrust of greater or less amount according to the speed of the motor, a frictional rotating device $g$, with which said shaft is adapted to engage to impart greater or less power thereto in one direction, and a power connected with said rotating device tending to rotate the same in opposition to the force imparted by the said frictional engagement with the shaft, said rotating device being connected with the brushes of the dynamo-electric machine to move the brushes backward when the power of the shaft overcomes the opposing power and to move the brushes forward when the power from the shaft is less than the opposing power, while the brushes are held at rest when the opposing forces upon the rotating device are balanced, substantially as and for the purpose specified.

5. A shaft driven by a variable power, in combination with a propeller-screw mounted rigidly thereon, said screw being inclosed in a chamber containing liquid, and a frictional rotating device, with which said shaft is in frictional engagement, the amount of the power exerted by said frictional engagement being increased by the thrust caused by the action of said screw in the liquid as the speed of the shaft is increased, substantially as and for the purpose specified.

6. In an electric-current regulator, the combination, with a dynamo-electrical machine having shifting commutator-brushes for adjusting the electro-motive force, of an electric motor included in the circuit of the dynamo adapted to vary its speed of rotation as the strength of the main current varies, and a propeller wheel or screw driven by said motor, together with mechanism for shifting the commutator-brushes, whereby the position of said brushes is controlled and regulated, so as to maintain a current of practically constant strength, substantially as shown and described.

In witness whereof I hereunto subscribe my name this 21st day of December, A. D. 1889.

ERNEST P. WARNER.

Witnesses:
C. G. HAWLEY,
ELLA EDLER.